US011292619B2

United States Patent
Turse et al.

(10) Patent No.: US 11,292,619 B2
(45) Date of Patent: Apr. 5, 2022

(54) FURLABLE SAIL DEVICES, SYSTEMS, AND METHODS

(71) Applicant: Roccor, LLC, Longmont, CO (US)

(72) Inventors: Dana Turse, Broomfield, CO (US); Bruce Davis, Boulder, CO (US); William Francis, Lyons, CO (US); Larry Adams, Thornton, CO (US); Andrew Tomchek, Erie, CO (US); Kamron Medina, Boulder, CO (US)

(73) Assignee: Roccor, LLC, Longmont, CO (US)

( * ) Notice: Subject to any disclaimer, the term of this patent is extended or adjusted under 35 U.S.C. 154(b) by 0 days.

(21) Appl. No.: 17/051,099

(22) PCT Filed: Apr. 27, 2019

(86) PCT No.: PCT/US2019/029537
§ 371 (c)(1),
(2) Date: Oct. 27, 2020

(87) PCT Pub. No.: WO2019/210286
PCT Pub. Date: Oct. 31, 2019

(65) Prior Publication Data
US 2021/0229840 A1 Jul. 29, 2021

Related U.S. Application Data

(60) Provisional application No. 62/663,321, filed on Apr. 27, 2018.

(51) Int. Cl.
*B64G 1/40* (2006.01)
*B64G 1/22* (2006.01)
(52) U.S. Cl.
CPC ............ *B64G 1/407* (2013.01); *B64G 1/222* (2013.01); *B64G 2700/66* (2013.01)

(58) Field of Classification Search
CPC .... B64G 1/407; B64G 1/222; B64G 2700/66; B64G 1/224; B64G 1/34; B64G 1/503; B64G 1/443; E04C 3/005
See application file for complete search history.

(56) References Cited

U.S. PATENT DOCUMENTS 4,047,339 A * 9/1977 Smith ..................... E04C 3/005
52/108
4,727,932 A * 3/1988 Mahefkey ................ B64G 1/50
165/104.26

(Continued)

FOREIGN PATENT DOCUMENTS

WO    WO2019210286    10/2019

OTHER PUBLICATIONS

Turse, Dana, et al., "Flight Testing of a Low Cost De-Orbiting Device for Small Satellites," Proceedings of the 42nd Aerospace Mechanisms Symposium, NASA Goddard Space Flight Center, May 16, 2014, pp. 183-188.

(Continued)

*Primary Examiner* — Medhat Badawi
*Assistant Examiner* — Vicente Rodriguez
(74) *Attorney, Agent, or Firm* — Wilson Patent Law, LLC

(57) ABSTRACT

Furlable sail devices, systems, and methods are provided in accordance with various embodiments. For example, some embodiments include a system and/or device that may include: a furlable boom; a furlable sail coupled with a distal end of the furlable boom; and/or a shear take-up mechanism coupled with a root end of the furlable sail. In some embodiments, the shear take-up mechanism applies tension to the furlable sail. The shear-take up mechanism may include one or more springs coupled with the root end of the furlable sail. In some embodiments, the furlable sheet includes a structural sheet. The structural sheet may include one or more areas with bending stiffness. The structural (Continued)

sheet may be fabricated to be self-supporting. In some embodiments, the furlable boom includes a slit-tube boom. Some embodiments may be configured as deorbit sails.

23 Claims, 16 Drawing Sheets

(56) References Cited

U.S. PATENT DOCUMENTS

| | | | |
|---|---|---|---|
| 5,080,306 A | 1/1992 | Porter | |
| 8,066,227 B2 | 11/2011 | Keller | |
| 8,104,415 B2 | 1/2012 | Higginson | |
| 8,123,172 B2 | 2/2012 | Peypoudat | |
| 8,683,755 B1 * | 4/2014 | Spence | B64G 1/222 52/108 |
| 9,004,410 B1 * | 4/2015 | Steele | B64G 1/44 244/172.7 |
| 9,528,264 B2 * | 12/2016 | Freebury | B32B 5/26 |
| 10,160,555 B2 * | 12/2018 | Turse | B64G 1/222 |
| 2003/0010869 A1 * | 1/2003 | Kawaguchi | H01Q 15/161 244/168 |
| 2007/0262204 A1 * | 11/2007 | Beidleman | B64G 1/222 244/172.6 |
| 2012/0138749 A1 | 6/2012 | Ellinghaus | |
| 2013/0186011 A1 | 7/2013 | Keller | |
| 2016/0304220 A1 | 10/2016 | Cecchini | |
| 2018/0022476 A1 | 1/2018 | Rasse | |

OTHER PUBLICATIONS

42nd Aerospace Mechanisms Symposium (Aerospace Mechanisms Symposia) Feb. 23, 2017, URL: https://aeromechanisms.com/42nd-ams-program-2014).

Davis, Bruce, et al.,"Planning for End-of-Life Satellite Disposal: The Story of a High Strain Composite Tip-Rolled De-Orbit Sail," 32nd Annual AIAA/USU Conference on Small Satellites, Aug. 9, 2018.

32nd Annual Small Satellite Conference (A.I. Solutions) Jun. 18, 2019, URL: https://ai-solutions.com/about-us/events/32nd-annual-small-satellite conference.

International Search Report and Written Opinion, International Appl. No. PCT/US19/29537, dated Jul. 15, 2019, USPTO/ISA.

Alhorn, Dean C., et al., "NanoSail-D: The Small Satellite That Could!," 25th Annual AIAA/USU Conference on Small Satellites, Aug. 10, 2011.

Harkness, Patrick, et al., "Development status of AEOLDOS—A deorbit module for small satellites," Adavnces in Space Research, vol. 54 (2014), pp. 82-91.

Hoyt, Robert P., et al., "The Terminator Tape: A Cost-Effective De-Orbit Module for End-of-Life Disposal of LEO Sattelites," American Institute of Aeronautics and Astronautics SPACE 2009 Conference and Exposition, Sep. 14, 2009.

Spence, Brian R., et al., "Mars Pathfinder Rover Egress Deployable Ramp Assembly," 30th Aerospace Mechanisms Symposium, May 1996, pp. 239-254.

Stohlman, Olive R., et al., "Development of the Deorbitsail flight model," American Institute of Aeronautics and Astronautics, 2014, pp. 1-12.

Surrey Space Centre, "DeorbitSail," flyer.

Turse, Dana, et al., "Flight Testing of a Low-Cost De-orbiting Device for Small Satellites," 2015 CubeSat Workshop, Logan UT, Aug. 8-9, 2015.

* cited by examiner

← 100

Furlable Boom 110

Furlable Sail 120

Shear Take-Up Mechanism 130

FIG. 1A

FURLABLE SAIL DEVICES, SYSTEMS, AND METHODS

CROSS-REFERENCES TO RELATED APPLICATIONS

This application is an international PCT patent application claiming priority benefit of U.S. provisional patent application Ser. No. 62/663,321, filed on Apr. 27, 2018 and entitled "FURLABLE SAIL DEVICES, SYSTEMS, AND METHODS," the entire disclosure of which is herein incorporated by reference for all purposes.

BACKGROUND

Deployable sails may have a variety of applications, such as deorbit sails, solar sails, and general planar apertures. A variety of issues may face deployable sail systems and/or devices, such as sail support, stowage, and/or deployment. There may be a need for new tools and techniques to address these different issues.

SUMMARY

Furlable sail devices, systems, and methods are provided in accordance with various embodiments. Embodiments may be configured for a variety of applications, such as deorbit sails, solar sails, RF applications, or other general deployable planar apertures. For example, some embodiments include a system and/or device that may include: a furlable boom; a furlable sail coupled with a distal end of the furlable boom; and/or a shear take-up mechanism coupled with a root end of the furlable sail.

In some embodiments, the shear take-up mechanism applies tension to the furlable sail. The shear take-up mechanism may include one or more springs coupled with the root end of the furlable sail.

In some embodiments, the furlable sail includes a structural sheet. In some embodiments, the structural sheet includes a fiber-reinforced polymer composite. The structural sheet may include one or more areas with bending stiffness. The structural sheet may be fabricated to be self-supporting. In some embodiments, the furlable sail is configured such that a distal end of the furlable sail remains partially furled after deployment.

Some embodiments include one or more rails coupled with the furlable sail to avoid telescoping during deployment or while stowed. The one or more rails coupled with the furlable sail may provide one or more hard stops with respect to one or more edges of the furlable boom in a stowed state.

Some embodiments include a hold down and release mechanism (HDRM) that may include a restraint strap to hold down the furlable boom and the furlable sail in a co-furled state. The restraint strap may be configured to curl away from furlable sail at least during or after deployment. The restraint strap may be tensioned and contain compliance to allow for a varying diameter for the furlable boom and the furlable sail in the co-furled state.

In some embodiments, the furlable sail is allowed to move with respect to the furlable boom during deployment. In some embodiments, the furlable sail includes a laminate structure to avoid ballooning. In some embodiments, furlable boom and the furlable sail are tip rolled. In some embodiments, the furlable boom is configured for self-deployment. In some embodiments, the furlable boom and the furlable sail are co-furled.

In some embodiments, the system and/or device is configured as a deorbit sail. In some embodiments, the system and/or device may be configured as a solar sail or other deployable planar aperture structures.

In some embodiments, the furlable boom includes a slit-tube boom. The slit-tube boom may include a high-strain composite material. The high-strain composite laminate geometry and/or material may be tailored along the slit-tube axial length to vary the deployment energy, authority and/or behavior. For example, at least the high-strain composite material or a high strain-composite laminate geometry of the slit-tube boom may be tailored along an axial length of the slit-tube boom to vary a deployment energy.

Some embodiments include one or more kickoff spring components configured to facilitate deployment of the furlable boom and the furlable sail from a stowed state. Some embodiments include a cylindrical component coupled with a distal end of the furlable boom. In some embodiments, the cylindrical component is coupled with the distal end of the furlable boom such that the distal end of the furlable boom remains at least flat or open during stowage and deployment. In some embodiments, the cylindrical component is coupled with the distal end of the furlable boom to facilitate at least consolidation or preloading of the furlable sail and the furlable boom.

Some embodiments include methods, systems, and/or devices as described in the specification and/or shown in the figures.

The foregoing has outlined rather broadly the features and technical advantages of embodiments according to the disclosure in order that the detailed description that follows may be better understood. Additional features and advantages will be described hereinafter. The conception and specific embodiments disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of different embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 1A shows a device and/or a system in accordance with various embodiments.

DETAILED DESCRIPTION

Figure 1B:
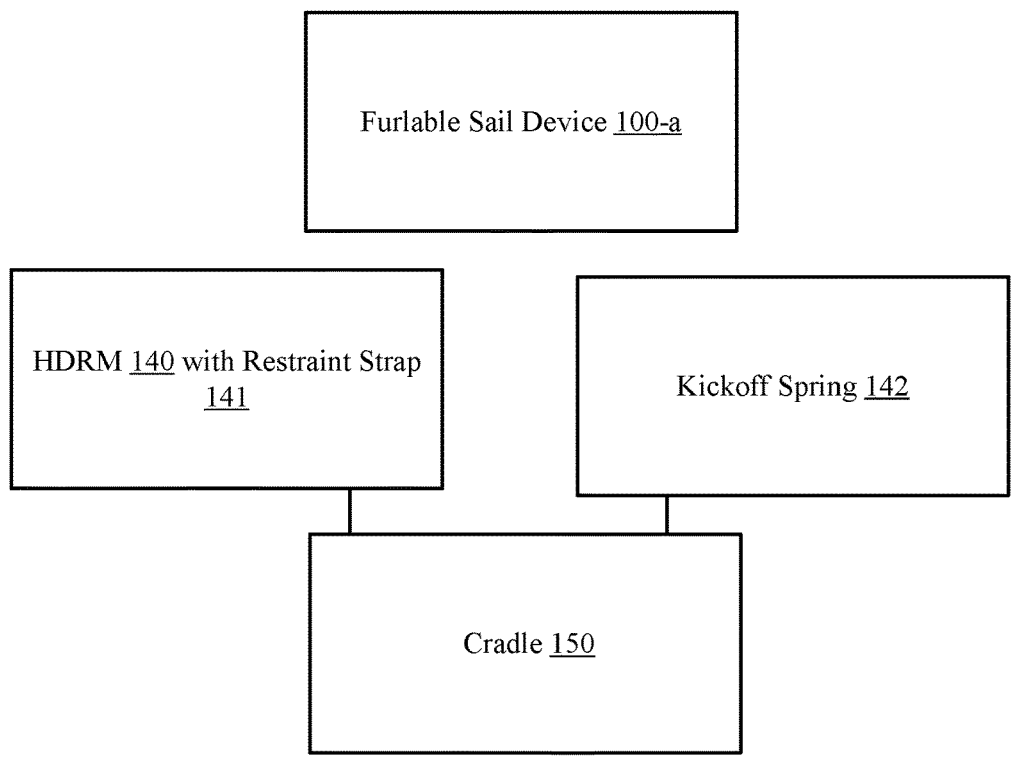
FIG. 1B shows a device and/or a system in accordance with various embodiments.

This description provides embodiments, and is not intended to limit the scope, applicability or configuration of the disclosure. Rather, the ensuing description will provide those skilled in the art with an enabling description for implementing embodiments of the disclosure. Various changes may be made in the function and arrangement of elements.

Thus, various embodiments may omit, substitute, or add various procedures or components as appropriate. For instance, it should be appreciated that the methods may be performed in an order different than that described, and that various stages may be added, omitted or combined. Also, aspects and elements described with respect to certain embodiments may be combined in various other embodiments. It should also be appreciated that the following systems, devices, and methods may individually or collectively be components of a larger system, wherein other procedures may take precedence over or otherwise modify their application.

Furlable sail devices, systems, and methods are provided in accordance with various embodiments. The furlable sail devices, systems, and/or methods may be applicable to a variety of applications, such as deorbit sails, solar sails, solar arrays, deployable antennas, RF shielding, and/or deployable planar apertures in general. Some embodiments provide a variety of stowage and deployment configurations. In general, the systems, devices, and/or methods provided may include a furlable boom and furlable sail that may utilize a shear take-up mechanism. Some embodiments provide for a deployed furlable sail without the need for traditional lateral supports, such as battens. For example, some embodiments utilize a furlable sail that may include a structural sheet that may be self-supporting. Some embodiments help avoid creep and/or telescoping with respect to the furlable sail and/or furlable boom in a stowed state during long term stowage, for example. The furlable boom and the furlable sail may be coupled with each other with respect to the distal ends of each component while the furlable sail may be coupled with the shear take-up mechanism at a root end of the furlable sail. Some embodiments tip roll the furlable boom and/or furlable sail.

Turning now to FIG. 1A, a device 100 is provided in accordance with various embodiments. Device 100 may be referred to as a furlable sail device and/or system in some embodiments. Device 100 may include a furlable boom 110, a furlable sail 120 coupled with a distal end of the furlable boom 110, and/or a shear take-up mechanism 130 coupled with a root end of the furlable sail 120.

In some embodiments, the shear take-up mechanism 130 applies tension to the furlable sail 120. The shear-take up mechanism 130 may include one or more springs coupled with the root end of the furlable sail 120. Some shear take-up mechanisms 130 may utilize other components, such as elastic members and/or motors, to facilitate shear take-up.

In some embodiments, the furlable sail 120 includes a structural sheet. In some embodiments, the structural sheet includes a fiber-reinforced polymer composite. The structural sheet may include one or more areas with bending stiffness. The structural sheet may be fabricated to be self-supporting. In some embodiments, the furlable sail is configured such that a distal end of the furlable sail remains partially furled after deployment.

Some embodiments include one or more rails coupled with the furlable sail 120 to avoid telescoping during deployment or while stowed. The one or more rails coupled with the furlable sail 120 may provide one or more hard stops with respect to one or more edges of the furlable boom 110 in a stowed state. In some embodiments, the one or more rails may be integrated into the construction of the furlable sail 120; in some embodiments, the one or more rails may be coupled with the furlable sail 120.

Some embodiments include a hold down and release mechanism that may include a restraint strap to hold down the furlable boom 110 and the furlable sail 120 in a co-furled state. The restraint strap may be configured to curl away from furlable sail 120 at least during or after release or deployment; the restraint strap may be configured for self-reverse coiling. The restraint strap may be tensioned and contain compliance to allow for a varying diameter for the furlable boom 110 and the furlable sail 120 in the co-furled state.

In some embodiments, the furlable sail 120 is allowed to move with respect to the furlable boom 110 during deployment. In some embodiments, the furlable sail 120 includes a laminate structure to avoid ballooning. In some embodiments, furlable boom 110 and the furlable sail 120 are tip rolled. In some embodiments, the furlable boom 110 is configured for self-deployment. In some embodiments, the furlable boom 110 and the furlable sail 120 are co-furled.

In some embodiments, device 100 is configured as a deorbit sail. In some embodiments, the device 100 may be configured as a solar sail or other deployable planar aperture structures for applications such as solar arrays and/or RF applications (e.g., antennas and/or shield).

In some embodiments, the furlable boom 110 includes a slit-tube boom. The slit-tube boom may include a high-strain composite material. The high-strain composite laminate geometry and/or material may be tailored along the slit-tube axial length to vary the deployment energy, authority, and/or behavior. For example, by varying the deployment energy, the boom's authority or behavior may be adapted for different uses.

Some embodiments one or more kickoff spring components configured to facilitate deployment of the furlable boom 110 and the furlable sail 120 from a stowed state. Some embodiments include a cylindrical component coupled with a distal end of the furlable boom 110. In some embodiments, the cylindrical component is coupled with the distal end of the furlable boom 110 such that the distal end of the furlable boom 110 remains at least flat or open during stowage and deployment. In some embodiments, the cylindrical component is coupled with the distal end of the furlable boom 110 to facilitate at least consolidation or preloading of the furlable sail 120 and/or the furlable boom 110.

FIG. 1B includes a system 101 in accordance with various embodiments. System 101 may include a furlable sail device 100-*a*, which may be an example of device 100 of FIG. 1A. System 101 may also include a hold down and release mechanism 140, which may include a restraint strap 141. System 101 may also include a cradle 150. System 101 may include other components, including, but not limited to, a kickoff spring 142, for example.

In some embodiments, the hold down and release mechanism (HDRM) 140 may include the restraint strap 141 to hold down the furlable boom and the furlable sail of device 100-*a* in a co-furled state. The restraint strap 141 may be configured to curl away from furlable sail of the device 100-*a* at least during or after deployment. The restraint strap 141 may be tensioned and contain compliance to allow for a varying diameter for the furlable boom and the furlable sail of device 100-*a* in the co-furled state.

When furled or stowed, the furlable sail device 100-*a* may be held in the cradle 150 with the restraint strap 141 of the HDRM 140. The kickoff spring 142 may facilitate the deployment of the furlable sail device 100-*a*; for example, the kickoff spring 142 may be coupled with the cradle such that the kickoff spring may push against the furlable sail device 100-*a* when in a furled state to facilitate deployment of the furlable sail device 100-*a* from its furled state with the release of the restraint strap 141 of the HDRM 140. Some embodiments may utilize a leaf spring as kickoff spring 142; other embodiments may utilize a compression spring or the kickoff spring components.

Figure 2A:
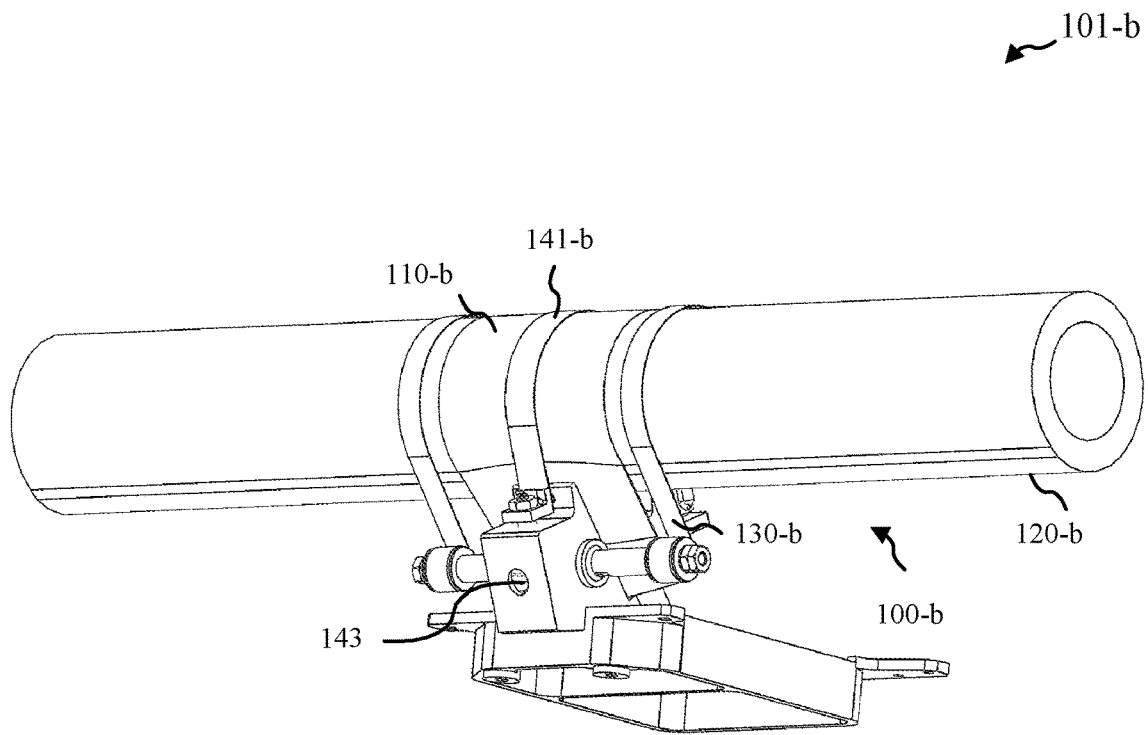
FIG. 2A shows a device and/or a system in accordance with various embodiments.
Figure 2B:
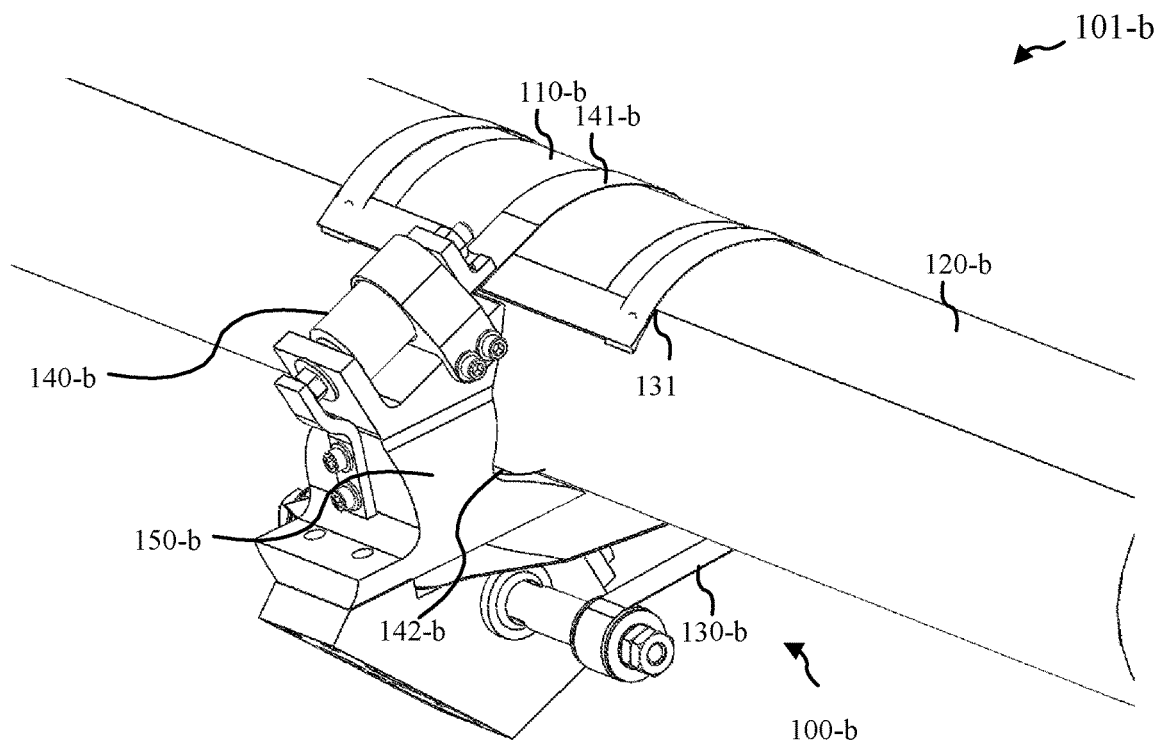
FIG. 2B shows a device and/or a system in accordance with various embodiments.

Turning now to FIG. 2A and FIG. 2B, two perspectives of a system 101-*b* in accordance with various embodiments. System 101-*b* may include a furlable sail device 100-*b*, which may include a furlable boom 110-*b*, a furlable sail 120-*b*, and a shear take-up mechanism 130-*b*. System 101-*b* may also show a cradle 150-*b* and a hold down and release mechanism 140-*b* with restraint strap 141-*b*. System 101-*b* may also show a kickoff spring 142-*b*. System 101-*b* is shown in a furled state. The furlable boom 110-*b* and the furlable sail 120-*b* may be tip rolled and/or co-furled. System 101-*b* may be an example of system 101 of FIG. 1B; device 100-*b* may be an example of device 100 of FIG. 1A and/or device 100-*a* of FIG. 1B.

In some embodiments, the shear take-up mechanism 130-*b* may apply tension to the furlable sail 120-*b*. The shear take-up mechanism 130-*b* may include one or more springs coupled with the root end or edge 131 of the furlable sail 120-*b*; other mechanisms may be utilized such as general elastic members and/or motors. In some embodiments, the shear take-up mechanism 130-*b* utilizes an offset constant force spring mechanism, which may enable sail tensioning; the tensioning may occur during stowage, during deployment, and/or at full deployment. In some embodiments, the shear take-up mechanism 130-*b* utilizes a cantilevered rod with Delrin dowel, for example. The shear take-up mechanism 130-*b* may also utilize an interface to couple with the deployable sail 120-*b*. In some embodiments, coupling the shear take-up mechanism 130-*b* with the furlable sail 120-*b* may involve reinforcing a portion of the furlable sail 120-*b* or utilize a reinforcement component. In some embodiments, the furlable sail 120-*b* includes structural reinforced areas at the interface or attachment points between the deployable sail 120-*b* and the shear take-up mechanism 130-*b*. For example, additional laminate layers of the furlable sail 120-*b* may provide such reinforcement. In some embodiments, the furlable sail 120-*b* is allowed to move with respect to the furlable boom 110-*b* during deployment. In some embodiments, the furlable sail 120-*b* may form a structural sheet, which may include a fiber-reinforced polymer composite, for example.

In some embodiments, the HDRM 140-*b* utilizes a Frangibolt neck, where a Frangibolt preload path may be independent of the restraint strap 141-*b* tightening. In some embodiments, the HDRM 140-*b* may be configured with a Frangibolt body capture cap and bolt capture plate. In some embodiments, the restraint strap 141-*b* is coupled with a strap preload spring 143, which may allow for significant travel. In some embodiments, the cradle 150-*b* provides a V-groove kinematic interface, which enable defined preload for the furled sail 120-*b* and boom 110-*b*.

Figure 3A:
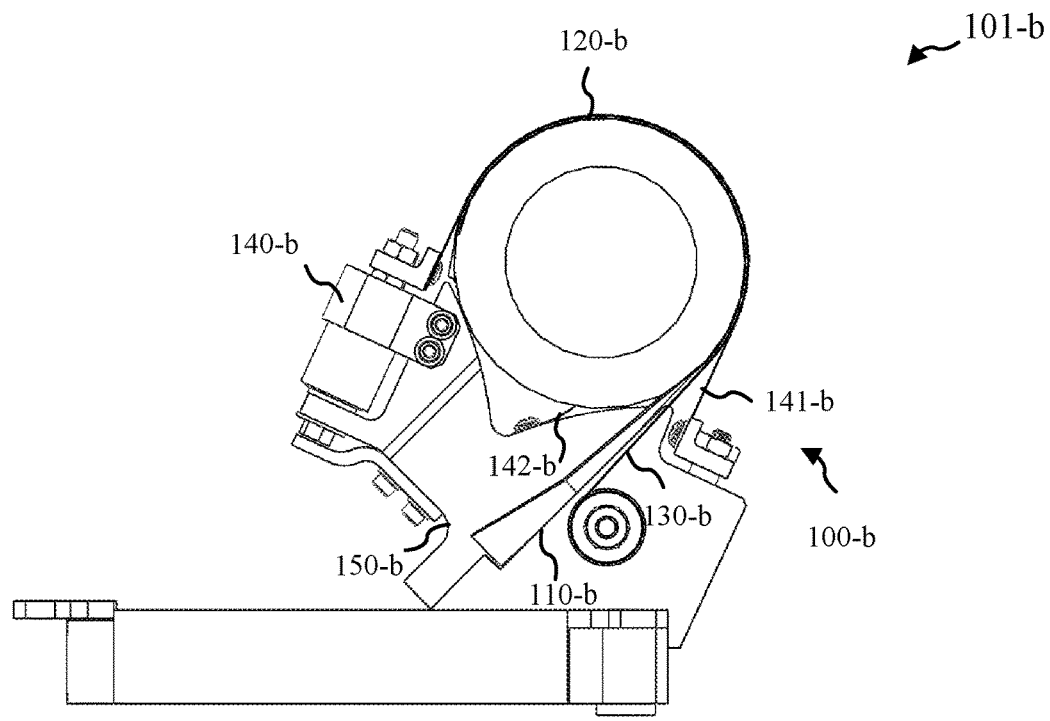
FIG. 3A shows a device and/or a system in accordance with various embodiments.
Figure 3B:
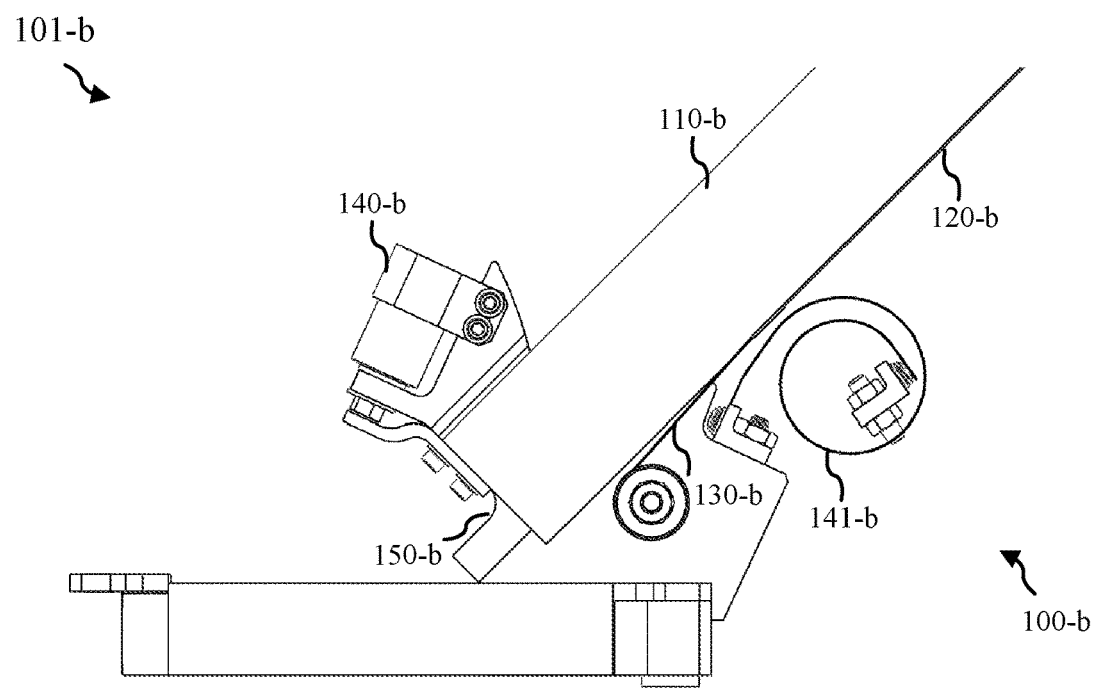
FIG. 3B shows a device and/or a system in accordance with various embodiments.

FIG. 3A and FIG. 3B show side perspectives of system 101-*b* in a stowed state (FIG. 3A) and a deployed state (FIG. 3B). For example, FIG. 3A shows the stowed state for system 101-*b* with a restraint strap 141-*b* and HDRM 140-*b* are set to hold the furlable sail device 100-*b*, with furlable boom 110-*b* and furlable sail 120-*b*, in a furled or stowed state. FIG. 3B may show a deployed state, where the HDRM 140-*b* has released the restraint strap 141-*b*. The restraint strap 141-*b* may coil away from the furlable sail 120-*b* and the furlable boom 110-*b* when they are deployed. The released restraint strap 141-*b* as may be shown in FIG. 3B may be back bent to enable a curling geometry once a preload is eliminated. Kickoff spring 142-*b* may facilitate deployment of the furlable sail device 100-*b*; FIG. 3A shows kickoff spring 142-*b* as a leaf spring in a stowed state.

Figure 4A:
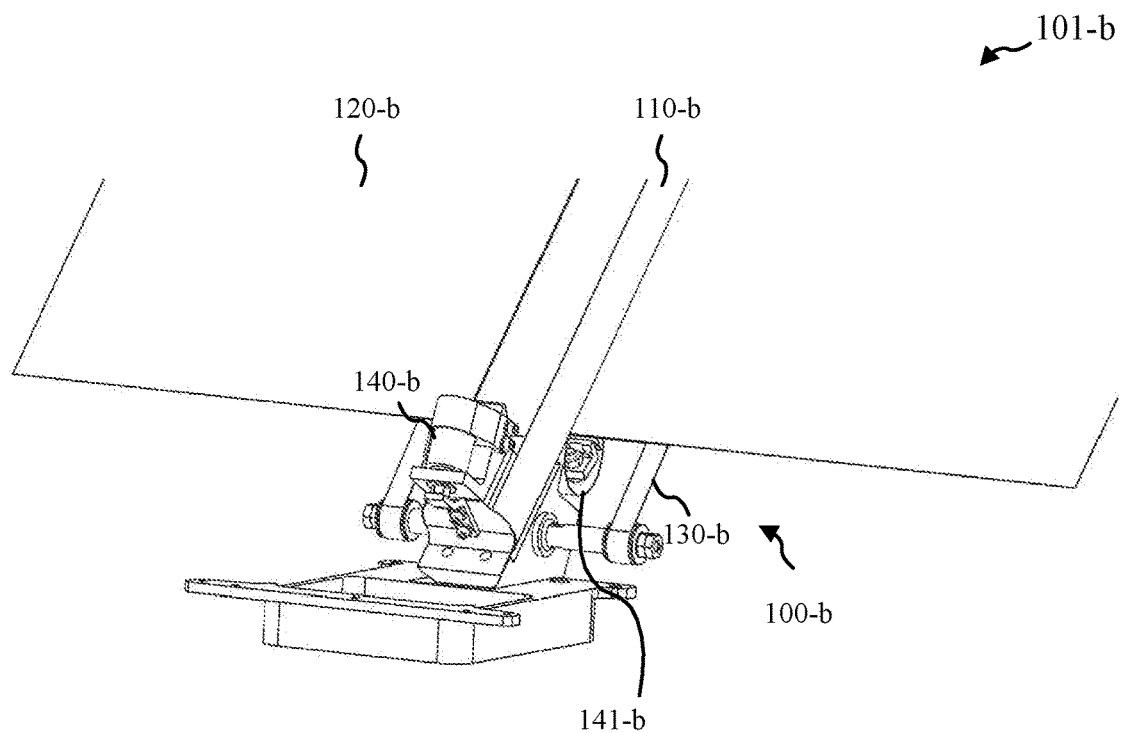
FIG. 4A shows a device and/or a system in accordance with various embodiments.
Figure 4B:
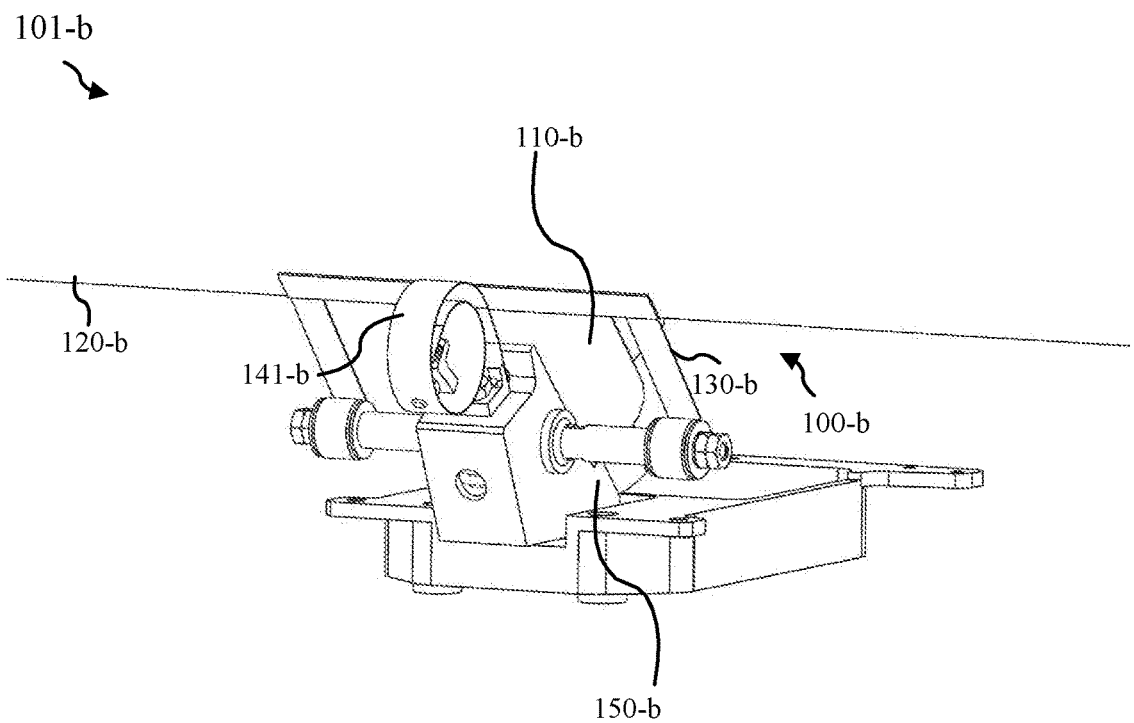
FIG. 4B shows a device and/or a system in accordance with various embodiments.

FIG. 4A and FIG. 4B show two further perspectives of system 101-*b* in a deployed state in accordance with various embodiments. These figures, for example, may show the deployed sail 120-*b* such the shear take-up mechanism 130-*b*, as constant force spring, provides tension to the deployed sail 120-*b*. FIG. 4A may also show the furlable boom 110-*b* as a slit-tube boom, having gone from a furled and rolled flat state to a tubular deployed state.

Figure 5:
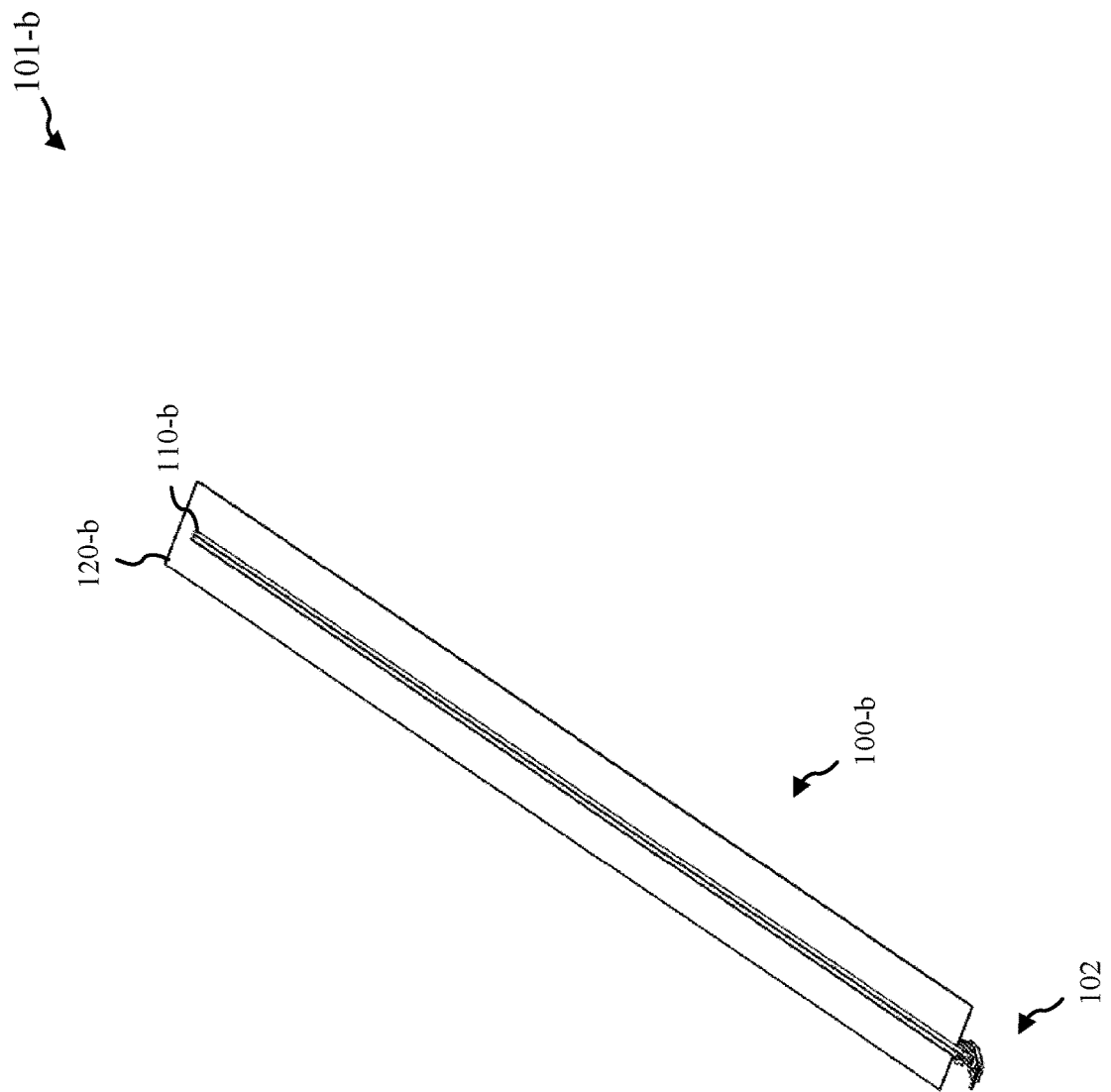
FIG. 5 shows a device and/or a system in accordance with various embodiments.

FIG. 5 shows system 101-*b* in a deployed state in accordance with various embodiments. FIG. 5 may focus on show the fully deployed furlable sail 120-*b* and fully deployed furlable boom 110-*b*. System 101-*b* may include other components 102, such as a shear take-up mechanism, HDRM, restraint strap, and/or cradle, though not specifically called out.

In some embodiments, the furlable sail 120-*b* includes a structural sheet. In some embodiments, the structural sheet includes a fiber-reinforced polymer composite. The structural sheet may include one or more areas with bending stiffness. The structural sheet may be fabricated to be self-supporting as may be shown in FIG. 5. For example, the furlable sail 120-*b* may generally fabricated as a laminate structure. For example, the furlable sail 120-*b* may include a fiber laminate, which may have axial and/or lateral fibers. In some embodiments, the furlable sail 120-*b* includes a glass/Mylar laminate. In some embodiments, the furlable sail 120-*b* includes a laminate structure to avoid ballooning.

The furlable boom 110-*b* may include a slit-tube boom, which may include a high-strain composite material in some embodiments. The high-strain composite laminate geometry and/or material may be tailored along the slit-tube axial length to vary the deployment energy, authority and/or behavior. For example, by varying the deployment energy, the boom's authority or behavior may be adapted for different uses. In general, the furlable boom 110-*b* and the furlable sail 120-*b* may be coupled with each other at the distal end of the furlable boom 110-*b*. At their root ends, the furlable boom 110-*b* may be coupled with a cradle, while the furlable sail 120-*b* may be coupled with a shear take-up mechanism. In some embodiments, the furlable sail 120-*b* is allowed to move with respect to the furlable boom 110-*b* during deployment. As shown in FIG. 5, the furlable sail 120-*b* may be completely unfurled when deployed, though in some embodiments, the furlable sail 120-*b* is configured such that the distal end of the furlable sail 120-*b* may remain partially furled after deployment.

In some embodiments, the furlable boom 110-*b* is configured for self-deployment. In some embodiments, the furlable boom 110-*b* may be fabricated as a neutrally-stable structure (or architecture), a mono-stable structure, or a variable combination of both neutrally-stable structure sections and mono-stable structure sections. For example, the furlable boom 110-*b* may be fabricated such a root portion may be formed as a neutrally-stable structure, while the distal portion may be formed as a mono-stable structure.

Figure 6A:
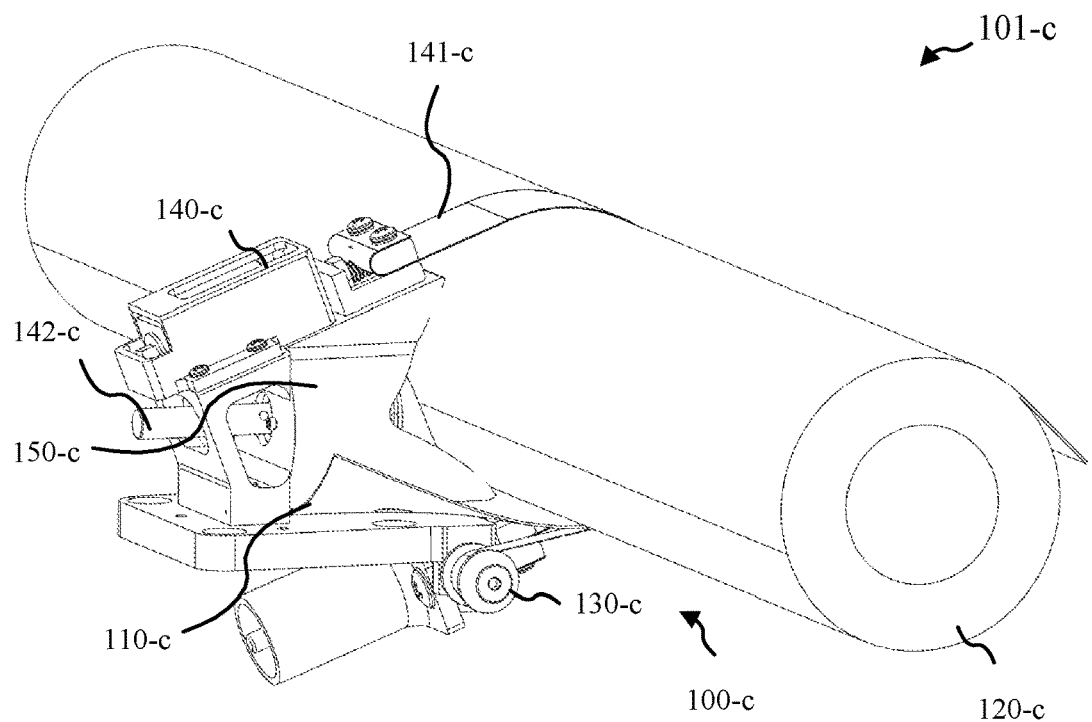
FIG. 6A shows a device and/or a system in accordance with various embodiments.
Figure 6B:
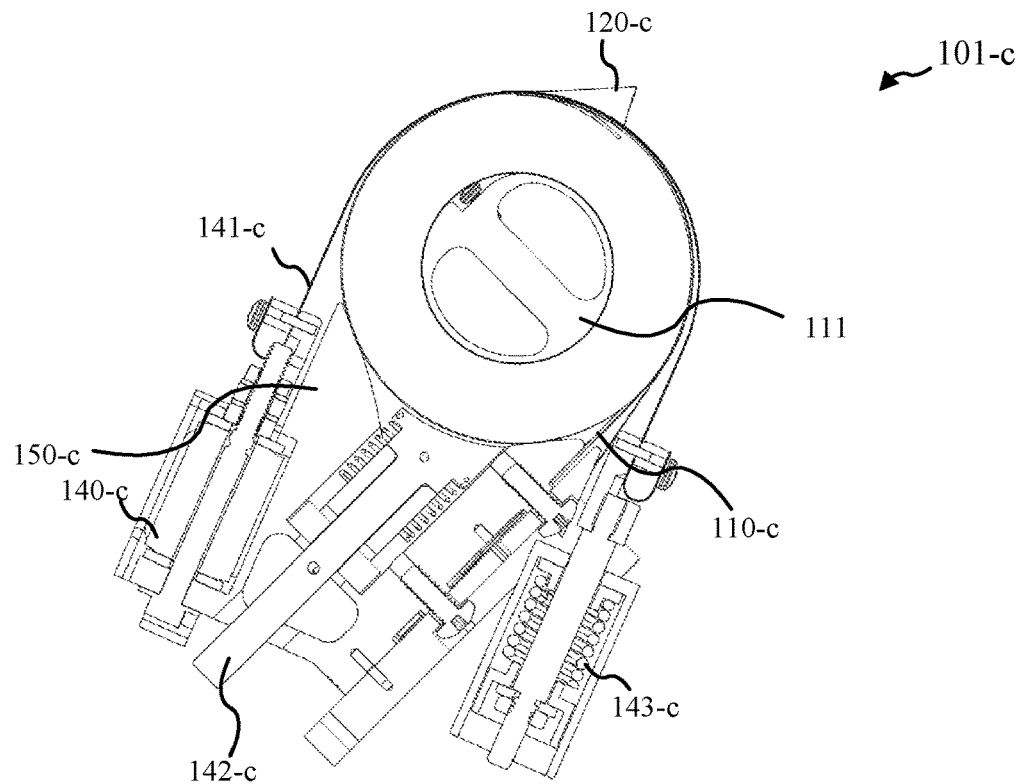
FIG. 6B shows a device and/or a system in accordance with various embodiments.
Figure 6C:
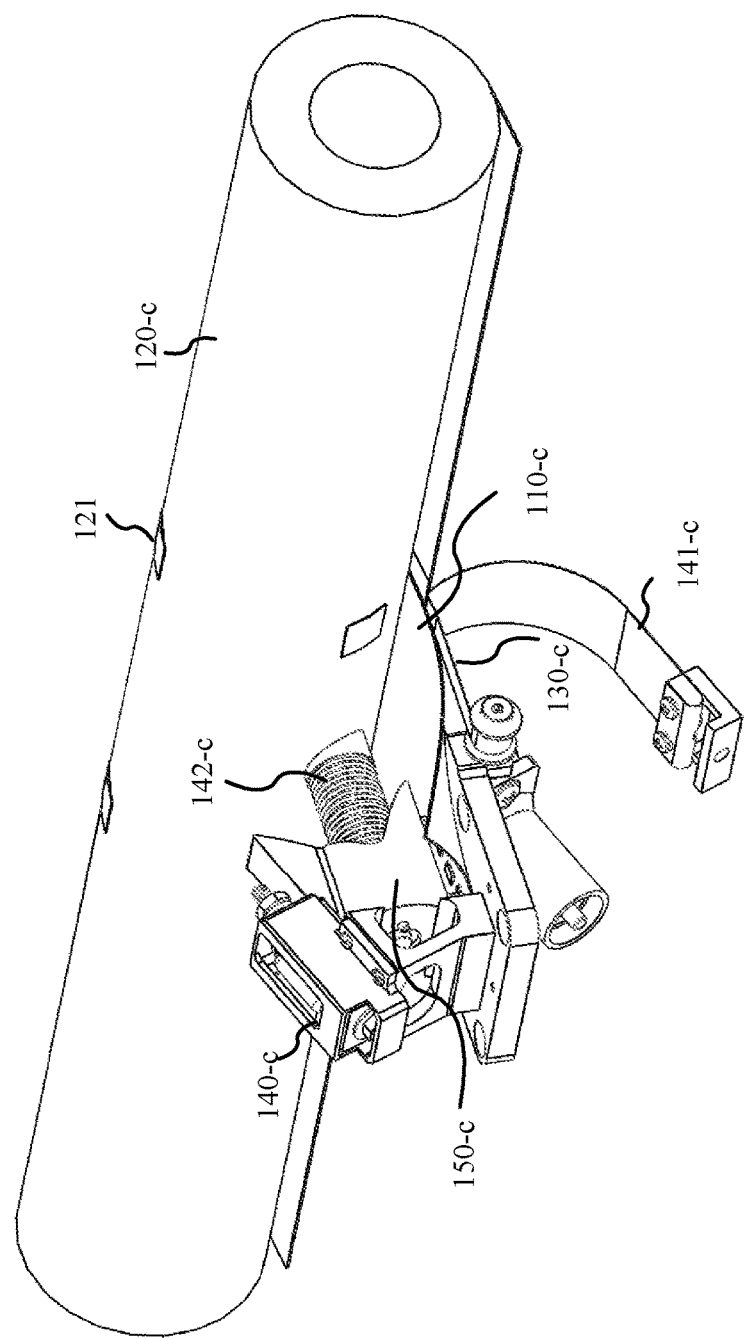
FIG. 6C shows a device and/or a system in accordance with various embodiments.

Turning now to FIG. 6A, FIG. 6B, and FIG. 6C, three perspectives of a system 101-*c* in accordance with various embodiments are provided. System 101-*c* may be an example of system 101 of FIG. 1B. System 101-*c* may include a furlable sail device 100-*c*, which may be an example of furlable sail device 100 of FIG. 1A and/or device 100-*a* of FIG. 1B. System 101-*c* may an include aspects of system 101-*b* of FIG. 2A and/or FIG. 2B. Device 100-*c* may include a furlable boom 110-*c*, a furlable sail 120-*c*, and a shear take-up mechanism 130-*c*. System 101-*c* may also show a cradle 150-*c* and a hold down and release mechanism 140-*c* with restraint strap 141-*c*. System 101-*c* may also show a kickoff spring 142-*c*. System 101-*c* may also include a cylindrical component 111, which may be referred to as a hub. System 101-*c* is shown in a furled state in FIG. 6A and FIG. 6B; system 101-*c* is shown in FIG. 6C after the restraint strap 141-*c* has been released from the hold down and release mechanism 140-*c*, where the restraint strap 141-*c* has curled away from the furlable sail 120-*c*. FIG. 6C may also show rail component(s) 121, which may provide a variety of functions as may be described in more detail with respect to FIG. 7A or FIG. 7B, for example. The furlable boom 110-*c* and the furlable sail 120-*c* may be tip rolled and/or co-furled.

In some embodiments, the shear take-up mechanism 130-*c* applies tension to the furlable sail 120-*c*. The shear take-up mechanism 130-*c* may include one or more springs coupled with the root end or edge of the furlable sail 120-*c*; in some embodiments, this involves reinforcing a portion of the furlable sail 120-*c* or utilize a reinforcement component. For example, the shear take-up mechanism 130-*c* may utilize an offset constant force spring mechanism, which may enable sail tensioning upon deployment. In some embodiments, the shear take-up mechanism 130-*c* may utilize a cantilevered rod with Delrin dowel, for example. The shear take-up mechanism 130-*c* may also utilize an interface to couple with the deployable sail 120-*c*. In some embodiments, the furlable sail 120-*c* is allowed to move with respect to the furlable boom 110-*c* during deployment.

In some embodiments, the HDRM 140-*c* utilizes a Frangibolt neck, where a Frangibolt preload path may be independent of the restraint strap 141-*c* tightening. In some embodiments, the HDRM 140-*c* is configured with a Frangibolt body capture cap and bolt capture plate. In some embodiments, the restraint strap 141-*c* is coupled with a strap preload spring 143-*c*, which may provide tension to strap 142-*c* and allow for significant travel. The restraint strap 141-*c* may be tensioned and contain compliance, such as with spring 143-*c* and/or HDRM 140-*c*, to allow for a varying diameter for the furlable boom 110-*c* and the furlable sail 120-*c* in the co-furled state.

In some embodiments, the cradle 150-*c* provides a V-groove kinematic interface, which enable defined preload for the furled sail 120-*c* and the furlable boom 110-*c*. System 101-*c* may also include kickoff spring 142-*c*, configured with a compression spring that may push a sliding component that may make contact with the furlable boom 110-*c* and/or furlable sail 120-*c*. The sliding component may provide a sliding surface that may be push against the furlable sail 120-*c* during stowage and/or during deployment. Other similar configurations may be utilized for the kickoff spring 142-*c*, such as a plug and boot configuration with a compression spring between the plug and boot components. In some embodiments, the compression spring includes a stainless-steel compression spring that may provide a low kickoff force.

The cylindrical component 111 may couple with a distal end of the furlable boom 110-*c* and/or furlable sail 120-*c*. The cylindrical component 111 may be formed as a separate hub element; in some embodiments, the cylindrical component 111 is formed as part of the distal end of the furlable boom 110-*c*. The cylindrical component 111 may facilitate furling the furlable boom 110-*c* and the furlable sail 120-*c*. The cylindrical component 111 may allow for proper consolidation of the furlable sail 120-*c* and furlable boom 110-*c* and for preloading in the stowed configuration. The cylindrical component 111 may be coupled with the furlable boom 110-*c* such that the distal end of the furlable boom 110-*c* remains flat and/or open during both stowage and deployment. In some embodiments, furlable boom 110-*c* and the furlable sail 120-*c* are tip rolled around the cylindrical component 111. Some embodiments are configured such that the distal end of the furlable sail 120-*c* may remain furled after deployment; this may work as an alternative configuration to the use of the cylindrical component 111 or may be utilized in conjunction with the cylindrical component 111.

Figure 7A:
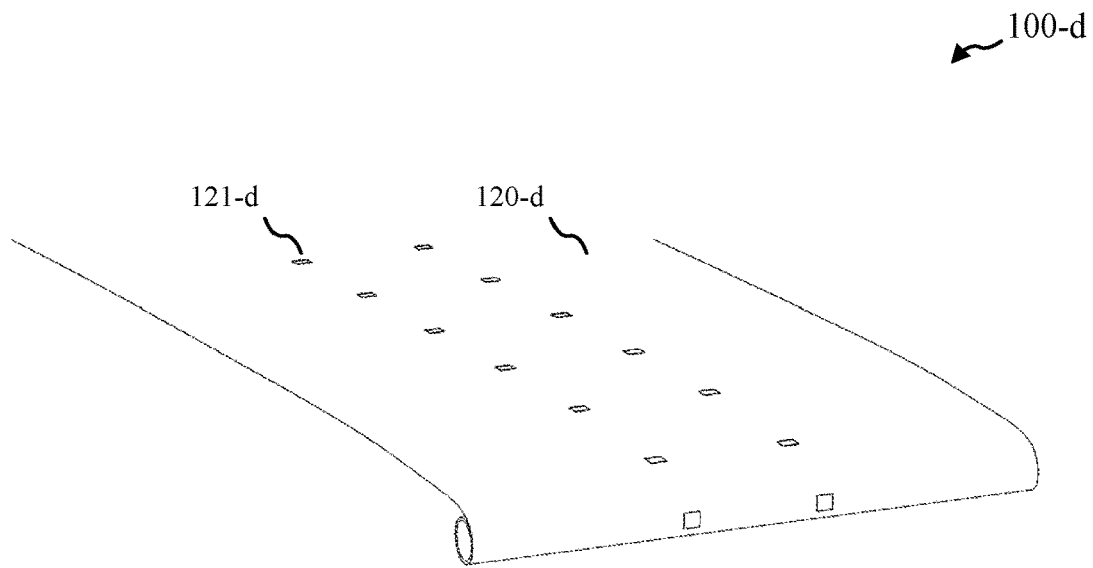
FIG. 7A shows a device and/or a system in accordance with various embodiments.
Figure 7B:
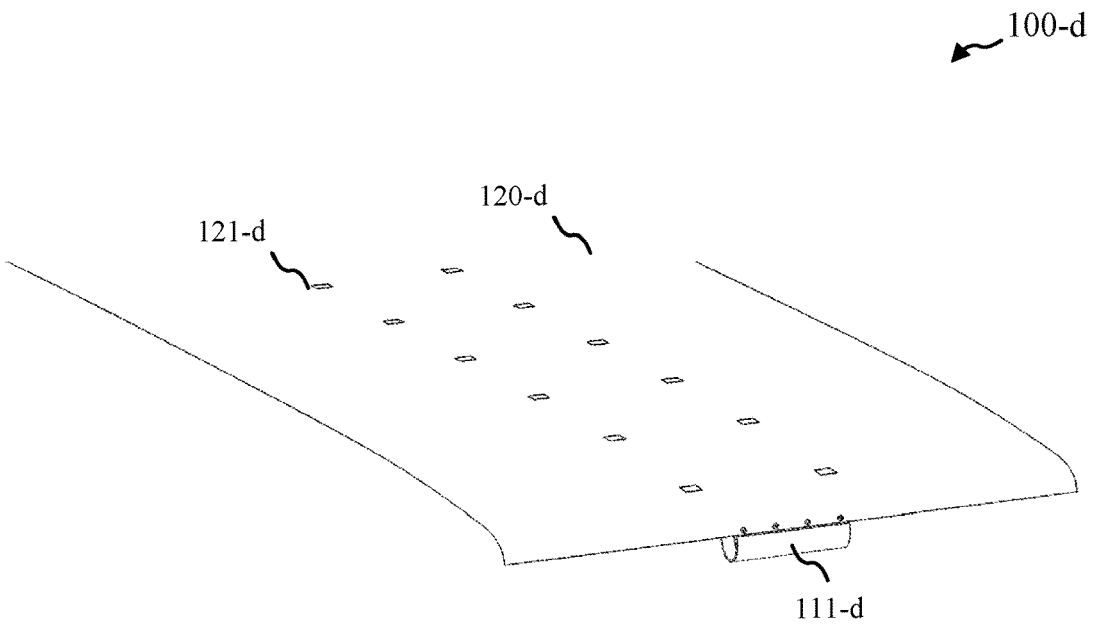
FIG. 7B shows a device and/or a system in accordance with various embodiments.

FIG. 7A and FIG. 7B show aspects of device 100-*d* in accordance with various embodiments. Device 100-*d* may be an example of aspects of device 100 of 1A, FIG. 1B, FIG. 2A, FIG. 2B, FIG. 3A, FIG. 3B, FIG. 4A, FIG. 4B, FIG. 5, FIG. 6A, FIG. 6B, and/or FIG. 6C. Device 100-*d* may show a furlable sail 120-*d* and one or more rails 121-*d*. Device 100-*d* may also show a cylindrical element 111-*d* that may be coupled at the distal edge of the furlable sail 110-*d* along with a furlable boom; see FIG. 7B.

The one or more rails 121-*d* may be coupled with the furlable sail 120-*d* to avoid telescoping during deployment or while stowed. For example, the one or more rails 121-*d* coupled with the furlable sail 120-*d* may provide one or more hard stops with respect to one or more edges of the furlable boom in a stowed state. This may help prevent relative motion between the furlable sail 120-*d* and the furlable boom in a stowed configuration. The cylindrical component 111-*d* may be coupled with a distal end of the furlable boom and/or furlable sail 120-*d*. FIG. 7B may show cylindrical component 111-*d* to represent how the furlable boom may fit between the two rows of rails 121-*d* such that the rails provide one or more hard stops for the furlable boom in a stowed state later shown in FIG. 7C. In some embodiments, the cylindrical component 111-*d* is coupled with the distal end of the furlable boom such that the distal end of the furlable boom remains at least flat or open during stowage and deployment. In some embodiments, the cylindrical component 111-*d* is coupled with the distal end of the furlable boom to facilitate consolidation of the furlable sail 120-*d* and the furlable boom.

The furlable sail 120-*d* may include one or more reinforced regions along its distal edge to facilitate coupling with the cylindrical component 111-*d* and/or a furlable boom. This reinforcement may include additional layers or aspects of the furlable sail 120-*d*.

Figure 7C:
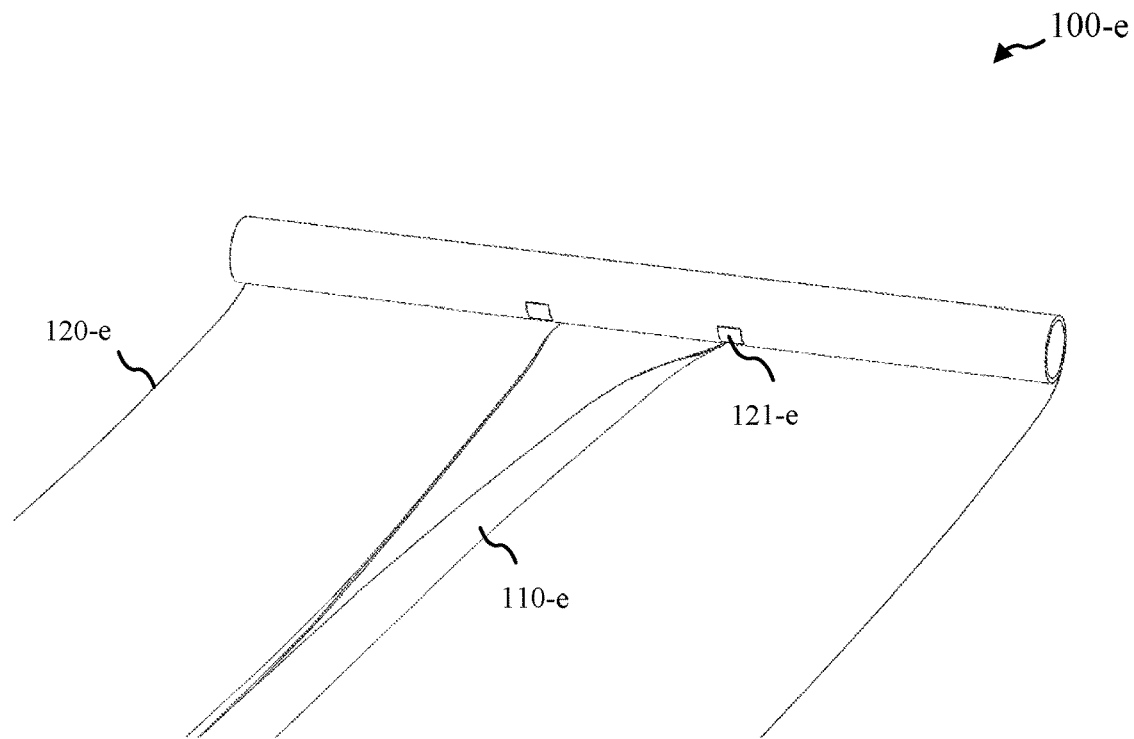
FIG. 7C shows a device and/or a system in accordance with various embodiments.
Figure 7D:
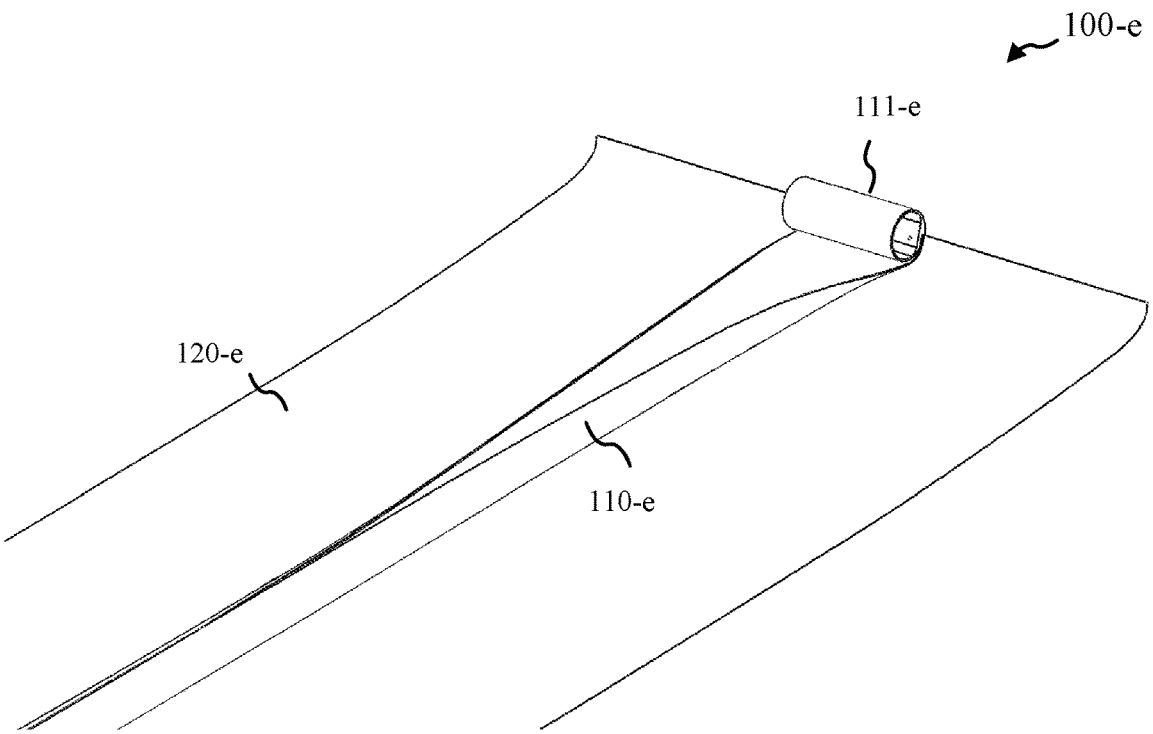
FIG. 7D shows a device and/or a system in accordance with various embodiments.

FIG. 7C and FIG. 7D show aspects of device 100-*e* in accordance with various embodiments. Device 100-*e* may be an example of aspects of device 100 of 1A, FIG. 1B, FIG. 2A, FIG. 2B, FIG. 3A, FIG. 3B, FIG. 4A, FIG. 4B, FIG. 5, FIG. 6A, FIG. 6B, FIG. 6C, FIG. 7A, and/or FIG. 7B. In particular, device 100-*e* may be an example of device 100-*d* of FIGS. 7A and/or 7B. Device 100-*e* may show a furlable sail 120-*e*, a furlable boom 110-*e*, one or more rails 121-*e*, and a cylindrical component 111-*e*. The cylindrical element 111-*e* may be coupled at the distal edge of the furlable sail 120-*e* and the furlable boom 110-*e*.

The cylindrical component 111-*e* may couple with a distal end of the furlable boom 110-*e* and/or furlable sail 120-*e*. The cylindrical component 111-*e* may be formed as a separate hub element; in some embodiments, the cylindrical component 111-*e* may be formed as part of the distal end of the furlable boom 110-*e*. The cylindrical component 111-*e* may facilitate furling the furlable boom 110-*e* and the furlable sail 120-*e*. The cylindrical component 111-*e* may be coupled with the furlable boom 110-*e* such that the distal end of the furlable boom 110-*e* remains flat and/or open during both stowage and deployment. In some embodiments, furlable boom 110-*e* and the furlable sail 110-*e* are tip rolled around the cylindrical component 111-*e*.

The furlable sail 120-*e* may include one or more reinforced regions along its distal edge to facilitate coupling with the cylindrical component 111-*e* and/or a furlable boom 110-*e*. This reinforcement may include additional layers or aspects of the furlable sail 120-*e*.

The one or more rails 121-*e* (see, e.g., FIG. 7C) may be coupled with the furlable sail 120-*e* to avoid telescoping during deployment or while stowed. For example, the one or more rails 121-*e* coupled with the furlable sail 120-*e* may provide one or more hard stops with respect to one or more edges of the furlable boom 110-*e* in a stowed state. This may help prevent relative motion between the furlable sail 120-*e* and the furlable boom 110-*e* in a stowed configuration.

Figure 7E:
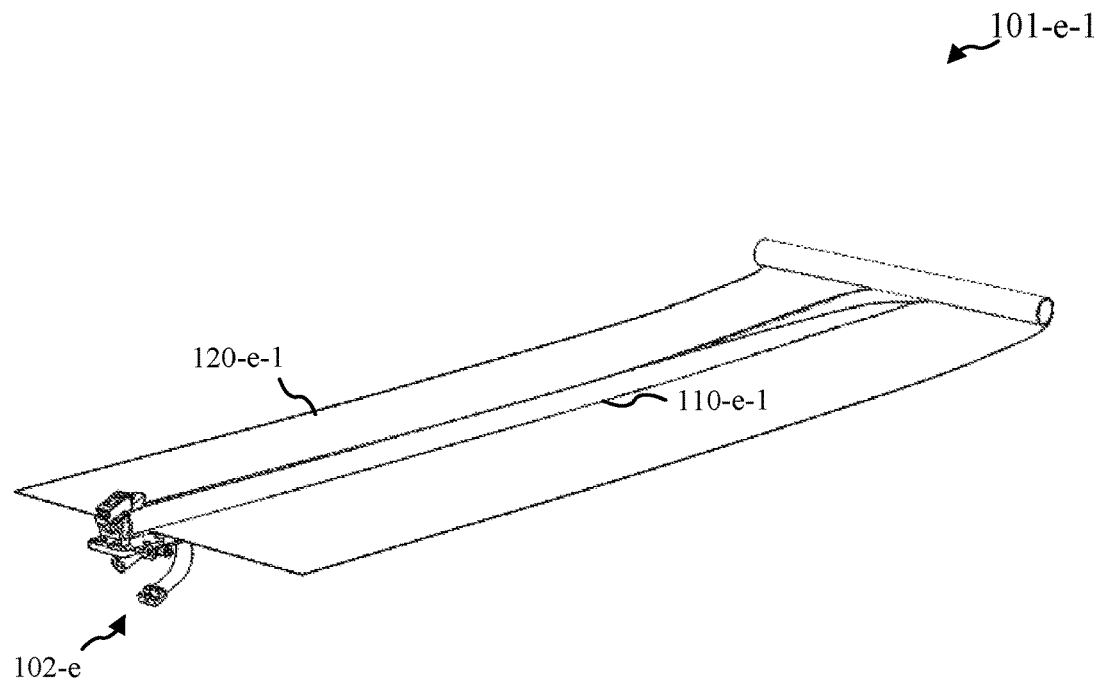
FIG. 7E shows a device and/or a system in accordance with various embodiments.
Figure 7F:
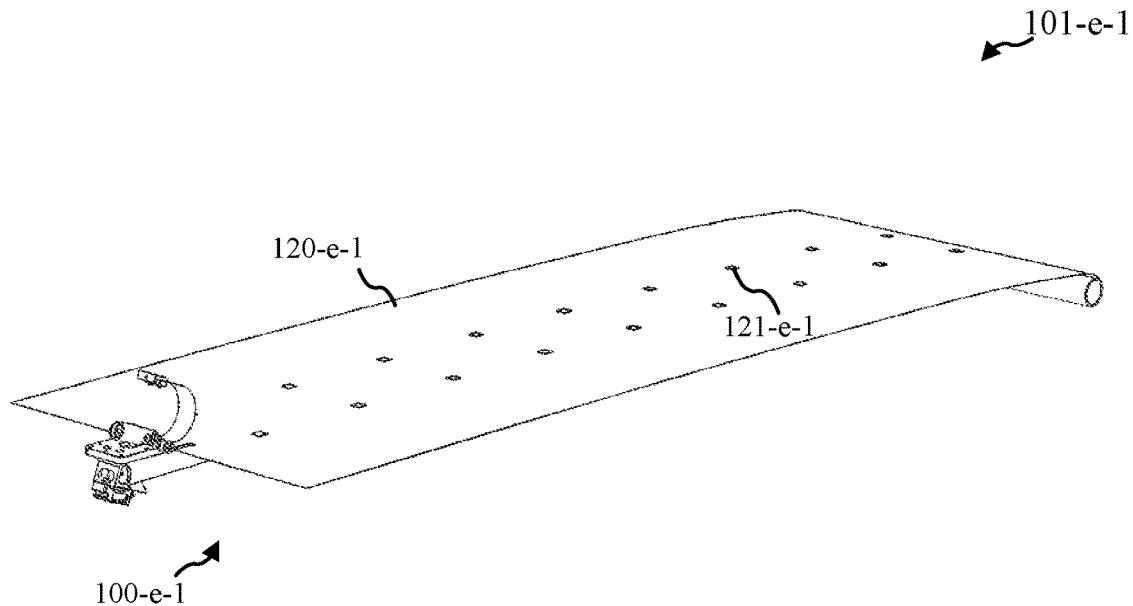
FIG. 7F shows a device and/or a system in accordance with various embodiments.

FIG. 7E and FIG. 7F show two views of a system 101-*e*-1 in a deployed state in accordance with various embodiments. FIG. 7E and FIG. 7F may focus on showing the deployed furlable sail 120-*e*-1 and deployed furlable boom 110-*e*-1. System 101-*e*-1 may include other components 102-*e*, such as a shear take-up mechanism, HDRM, restraint strap, and/or cradle, though not specifically called out. FIG. 7F may also show one or more rails 121-*e*-1. Furlable sail 120-*e*-1 may be an example of furlable sail 120-*d* and/or 120-*e*, for example. System 100-*e*-1 may be an example of system 101 of FIG. 1B and/or 101-*c* of FIG. 6A, FIG. 6B, and/or FIG. 6C.

In some embodiments, the furlable sail 120-*e*-1 may include a structural sheet. In some embodiments, the structural sheet includes a fiber-reinforced polymer composite. The structural sheet may include one or more areas with bending stiffness. The structural sheet may be fabricated to be self-supporting as may be shown in FIG. 7E and/or FIG. 7F. For example, the furlable sail 120-*e*-1 may generally fabricated as a laminate structure. For example, the furlable sail 120-*e*-1 may include a fiber laminate, which may have axial and/or lateral fibers. In some embodiments, the furlable sail 120-*e*-1 may include a glass/Mylar laminate. In some embodiments, the furlable sail 120-*e*-1 includes a laminate structure to avoid ballooning.

The furlable boom 110-*e*-1 may include a slit-tube boom, which may include a high-strain composite material in some embodiments. The high-strain composite laminate geometry and/or material may be tailored along the slit-tube axial length to vary the deployment energy, authority and/or behavior. For example, by varying the deployment energy, the boom's authority or behavior may be adapted for different uses. In general, the furlable boom 110-*e*-1 and the furlable sail 120-*e*-1 may be coupled with each other at the distal end of the furlable boom 110-*e*-1. At their root ends, the furlable boom 110-*e*-1 may be coupled with a cradle, while the furlable sail 120-*e*-1 may be coupled with a shear take-up mechanism. In some embodiments, the furlable sail 120-*e*-1 is allowed to move with respect to the furlable boom 110-*e*-1 during deployment. As shown in FIG. 7E and/or FIG. 7F, the furlable sail 120-*e*-1 may not be completely unfurled when deployed, though in some embodiments, the furlable sail 120-*e*-1 may be configured such that the distal end of the furlable sail 120-*e*-1 may be completely unfurled after deployment.

In some embodiments, the furlable boom 110-*e*-1 is configured for self-deployment. In some embodiments, the furlable boom 110-*e*-1 may be fabricated as a neutrally-stable structure (or architecture), a mono-stable structure, or a variable combination of both neutrally-stable structure sections and mono-stable structure sections. For example, the furlable boom 110-*e*-1 may be fabricated such a root portion may be formed as a neutrally-stable structure, while the distal portion may be formed as a mono-stable structure.

Figure 8B:
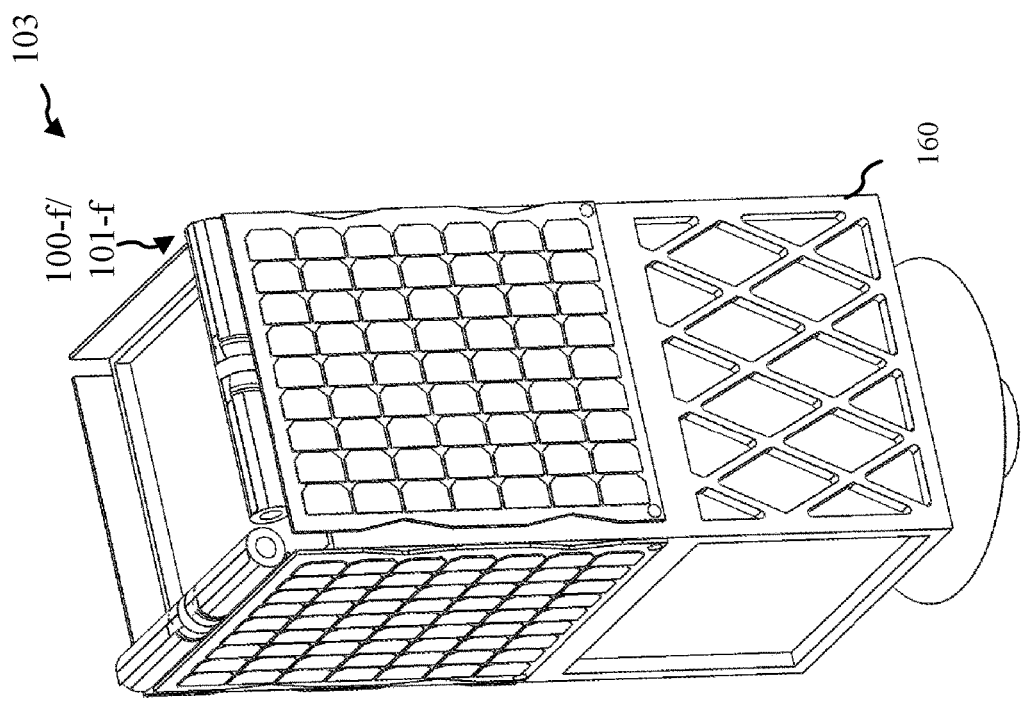
FIG. 8B shows a device and/or a system in accordance with various embodiments.
Figure 8A:
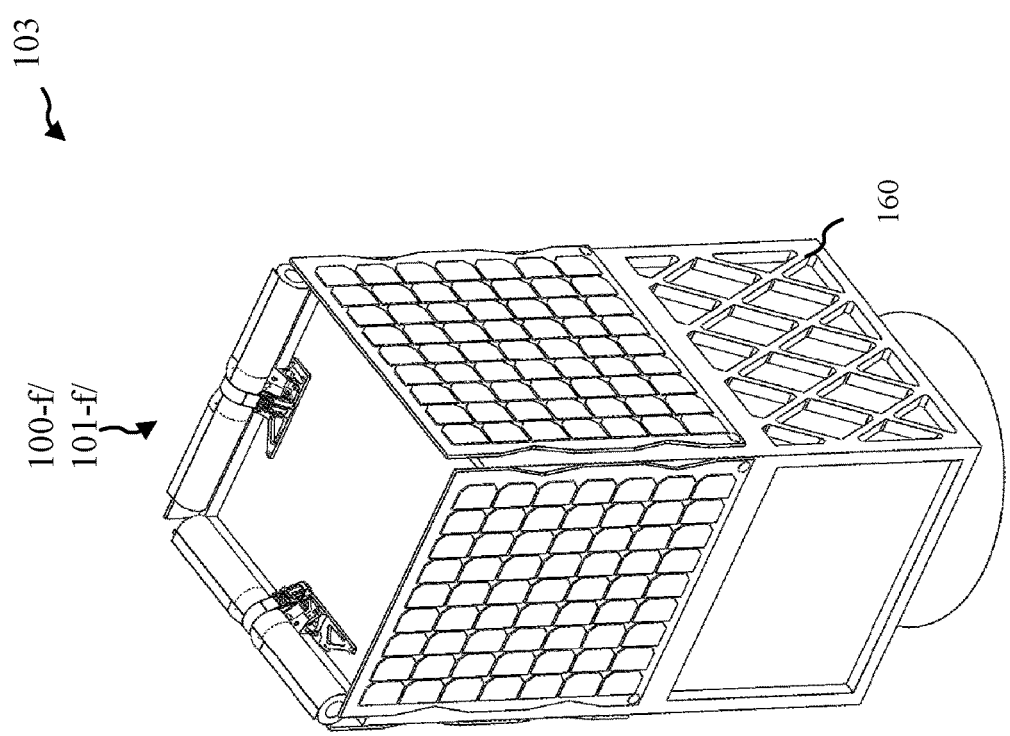
FIG. 8A shows a device and/or a system in accordance with various embodiments.
Figure 8C:
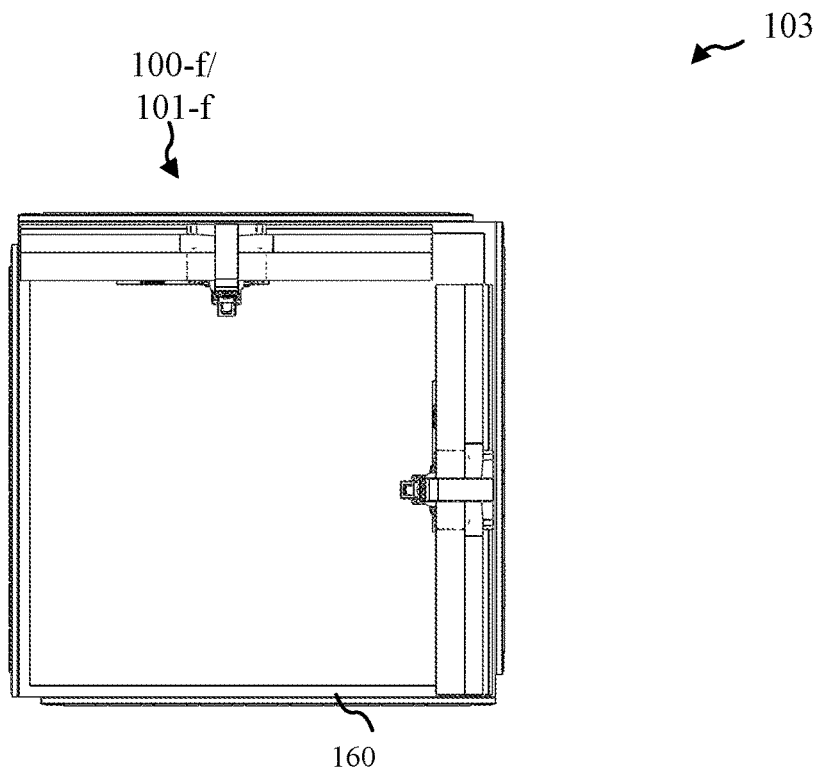
FIG. 8C shows a device and/or a system in accordance with various embodiments.

Turning now to FIG. 8A, FIG. 8B, and FIG. 8C, a system 103 in accordance with various embodiments are shown from different perspectives in a stowed or furled state. System 103 may include one or more furlable sail devices 100-*f* and/or furlable sail systems 101-*f*, which may be shown in a furled state. System 103 may show two furlable sail devices 100-*f* and/or systems 101-*f*; some embodiments may include more or fewer devices 100-*f* and/or systems 101-*f* The furlable sail device 100-*f* and/or furlable sail system 101-*f* may be coupled with a spacecraft 160. Furlable sail device 100-*f* may be an example of devices 100 of FIG. 1A, FIG. 1B, FIG. 2A, FIG. 2B, FIG. 3A, FIG. 3B, FIG. 4A, FIG. 4B, FIG. 5, FIG. 6A, FIG. 6B, FIG. 6C, FIG. 7A, FIG.

Figure 8D:
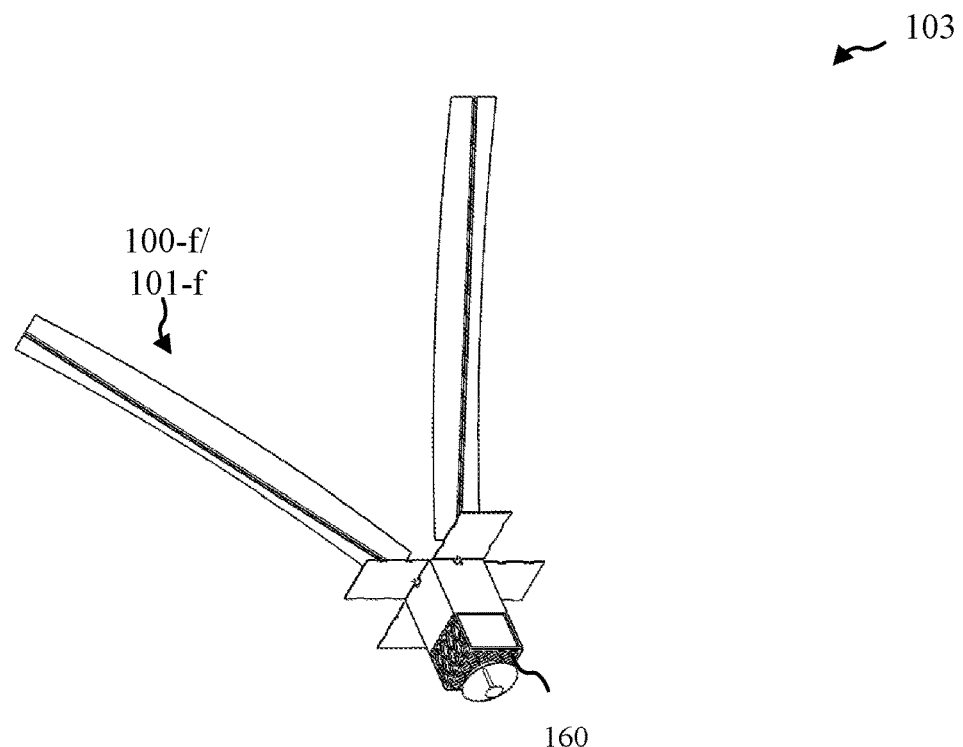
FIG. 8D shows a device and/or a system in accordance with various embodiments.
Figure 8E:
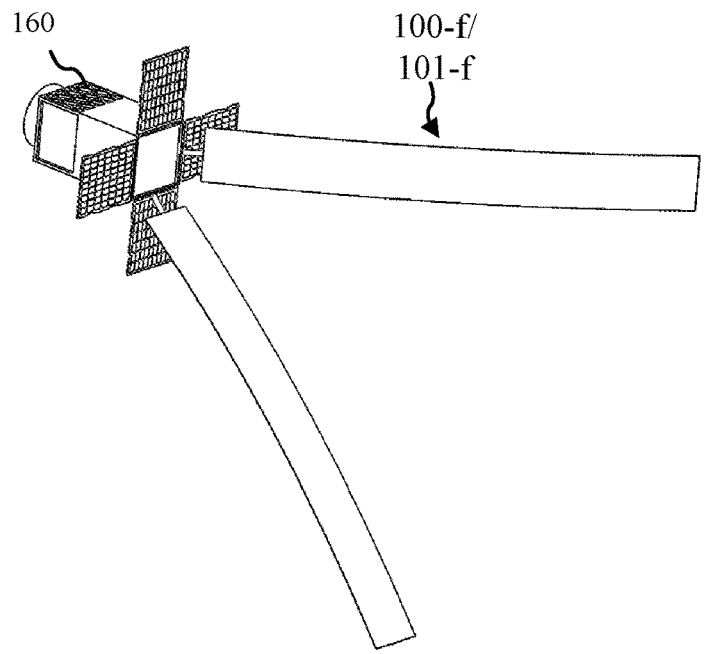
FIG. 8E shows a device and/or a system in accordance with various embodiments.
Figure 8F:
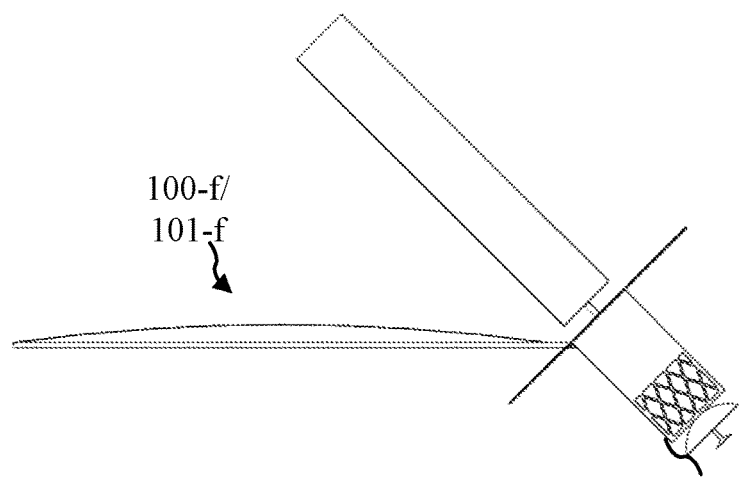
FIG. 8F shows a device and/or a system in accordance with various embodiments.

7B, FIG. 7C, FIG. 7D, FIG. 7E, and/or FIG. 7F; furlable sail system 101-f may be an example of systems 101 of FIG. 1B, FIG. 2A, FIG. 2B, FIG. 3A, FIG. 3B, FIG. 4A, FIG. 4B, FIG. 5, FIG. 6A, and/or FIG. 6B. FIG. 8D, FIG. 8E, and FIG. 8F show system 103 from different perspectives in accordance with various embodiments. The one or more furlable sail devices 100-f and/or furlable sail systems 101-f may be shown in a deployed state. System 103 may provide an example where the furlable sail devices 100-f and/or furlable sail systems 101-f may be configured as deorbit sails, though may be configured for other purposes as noted elsewhere herein.

Figure 9A:
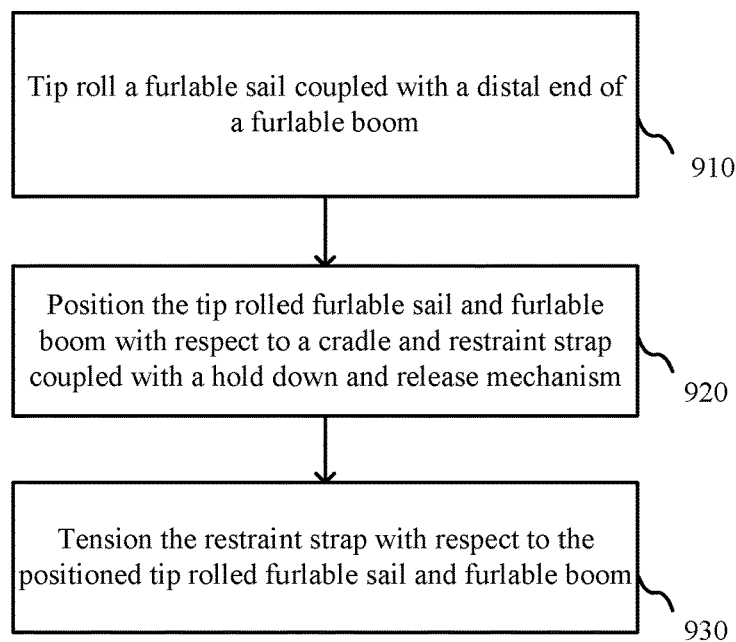
FIG. 9A shows a flow diagram of a method in accordance with various embodiments.

Turning now to FIG. 9A, a flow diagram of a method 900 is shown in accordance with various embodiments. Method 900 may be implemented utilizing a variety of systems and/or devices such as those shown and/or described with respect to FIG. 1A, FIG. 1B, FIG. 2A, FIG. 2B, FIG. 3A, FIG. 3B, FIG. 4A, FIG. 4B, FIG. 5, FIG. 6A, FIG. 6B, FIG. 6C, FIG. 7A, FIG. 7B, FIG. 7C, FIG. 7D, FIG. 7E, FIG. 7F, FIG. 8A, FIG. 8B, FIG. 8C, FIG. 8D, FIG. 8E, and/or FIG. 8F. In FIG. 9A, the specific selection of steps shown and the order in which they are shown is intended merely to be illustrative. It is possible for certain steps to be performed in alternative orders, for certain steps to be omitted, and for certain additional steps to be added according to different embodiments. Some but not all of these variants are noted in the description that follows.

At block 910, a furlable sail coupled with a distal end of a furlable boom may be tip rolled together. In some embodiments, the furlable sail and the furlable boom may be tip rolled around a cylindrical component, such as a hub. At block 920, the tip rolled furlable sail and furlable boom may be positioned with respect to a cradle and restraint strap coupled with a hold down and release mechanism. At block 930, the restraint strap may be tensioned and contain compliance with respect to the positioned tip rolled furlable sail and furlable boom. In some embodiments, a shear take-up mechanism may be coupled with a root end of the furlable sail; this may occur at a variety of different times such as before the furlable sail is tip rolled, before the tip rolled furlable sail is positioned with respect to the cradle; before the restrain strap is tensioned, and/or after the restraint strap is tensioned. A root end of the furlable boom may be coupled with the cradle. The device and/or system may be coupled with a spacecraft in some embodiments.

Figure 9B:
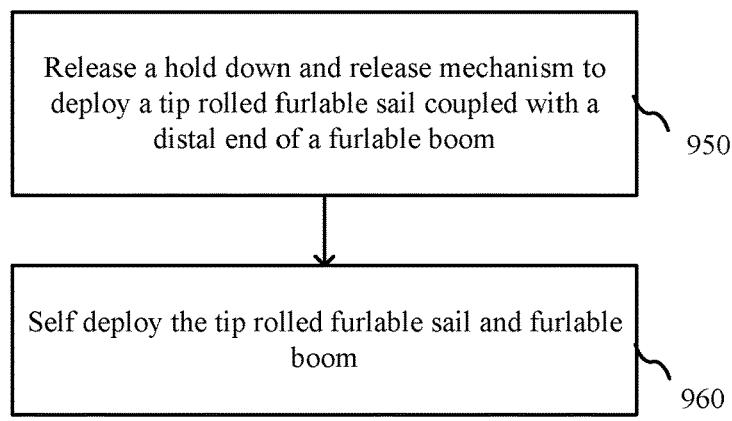
FIG. 9B shows a flow diagram of a method in accordance with various embodiments.

Turning now to FIG. 9B, a flow diagram of a method 901 is shown in accordance with various embodiments. Method 901 may be implemented utilizing a variety of systems and/or devices such as those shown and/or described with respect to FIG. 1A, FIG. 1B, FIG. 2A, FIG. 2B, FIG. 3A, FIG. 3B, FIG. 4A, FIG. 4B, FIG. 5, FIG. 6A, FIG. 6B, FIG. 6C, FIG. 7A, FIG. 7B, FIG. 7C, FIG. 7D, FIG. 7E, FIG. 7F, FIG. 8A, FIG. 8B, FIG. 8C, FIG. 8D, FIG. 8E, and/or FIG. 8F. In FIG. 9B, the specific selection of steps shown and the order in which they are shown is intended merely to be illustrative. It is possible for certain steps to be performed in alternative orders, for certain steps to be omitted, and for certain additional steps to be added according to different embodiments. Some but not all of these variants are noted in the description that follows.

At block 950, a hold down and release mechanism may be released to deploy a tip rolled furlable sail coupled with a distal end of a furlable boom. At block 960, the tip rolled furlable sail and furlable boom may be self-deployed. A root end of the furlable sail may be tensioned with a shear take-up mechanism; this may occur at a variety of different times such as during stowage, during deployment, and/or after deployment.

These embodiments may not capture the full extent of combination and permutations of materials and process equipment. However, they may demonstrate the range of applicability of the method, devices, and/or systems. The different embodiments may utilize more or fewer stages than those described.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various stages may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the embodiments.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which may be depicted as a flow diagram or block diagram or as stages. Although each may describe the operations as a sequential process, many of the operations can be performed in parallel or concurrently. In addition, the order of the operations may be rearranged. A process may have additional stages not included in the figure.

Having described several embodiments, it will be recognized by those of skill in the art that various modifications, alternative constructions, and equivalents may be used without departing from the spirit of the different embodiments. For example, the above elements may merely be a component of a larger system, wherein other rules may take precedence over or otherwise modify the application of the different embodiments. Also, a number of stages may be undertaken before, during, or after the above elements are considered. Accordingly, the above description should not be taken as limiting the scope of the different embodiments.

What is claimed is:

1. A device comprising:
   a furlable boom;
   a furlable sail coupled with a distal end of the furlable boom;
   a hold down and release mechanism that includes a restraint strap to hold down the furlable boom and the furlable sail in a co-furled state; and
   a shear take-up mechanism coupled with a root end of the furlable sail such that the shear take-up mechanism applies tension to the root end of the furlable sail in at least a deployed state and remains proximal to the root end of the furlable sail in the deployed state.

2. The device of claim 1, wherein the shear take-up mechanism includes one or more springs coupled with the root end of the furlable sail.

3. The device of claim 1, wherein the furlable sail is a structural sheet.

4. The device of claim 3, wherein the structural sheet includes one or more areas with bending stiffness.

5. The device of claim 3, wherein the structural sheet is self-supporting.

6. The device of claim 1, further comprising one or more rails coupled with the furlable sail to avoid telescoping during deployment or while stowed.

7. The device of claim 6, wherein the one or more rails coupled with the furlable sail provide one or more hard stops with respect to one or more edges of the furlable boom in a stowed state.

8. The device of claim 1, wherein the restraint strap is configured to curl away from the furlable sail at least during or after deployment.

9. The device of claim 1, wherein the restraint strap is tensioned and contain compliance to allow for a varying diameter for the furlable boom and the furlable sail in the co-furled state.

10. The device of claim 1, wherein the furlable sail is allowed to move with respect to the furlable boom during deployment.

11. The device of claim 1, wherein the furlable boom and the furlable sail are tip rolled.

12. The device of claim 1, wherein the furlable boom is configured for self-deployment.

13. The device of claim 1, wherein the furlable boom and the furlable sail are co-furled.

14. The device of claim 1, wherein the device is configured as a deorbit sail.

15. The device of claim 1, wherein the furlable boom includes a slit-tube boom.

16. The device of claim 15, wherein the slit-tube boom includes a high-strain composite material.

17. The device of claim 16, wherein at least the high-strain composite material or a high-strain composite laminate geometry of the slit-tube boom is tailored along an axial length of the slit-tube boom to vary a deployment energy.

18. The device of claim 1, further comprising one or more kickoff spring components configured to facilitate deployment of the furlable boom and the furlable sail from a stowed state.

19. The device of claim 1, further comprising a cylindrical component coupled with a distal end of the furlable boom.

20. The device of claim 19, wherein the cylindrical component is coupled with the distal end of the furlable boom such that the distal end of the furlable boom remains at least flat or open during stowage and deployment.

21. The device of claim 19, wherein the cylindrical component is coupled with the distal end of the furlable boom to facilitate at least consolidation or preloading of the furlable sail and the furlable boom.

22. The device of claim 3, wherein the structural sheet is a fiber-reinforced polymer composite.

23. The device of claim 1, wherein the furlable sail is configured such that a distal end of the furlable sail remains partially furled after deployment.

* * * * *